(12) United States Patent
Fischer et al.

(10) Patent No.: US 7,847,223 B2
(45) Date of Patent: Dec. 7, 2010

(54) ELECTROMAGNETIC PULSE WELDING OF FLUID JOINTS

(75) Inventors: Allen Fischer, Creve Coeur, MO (US); David R. Bolser, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/865,452

(22) Filed: Oct. 30, 2007

(65) Prior Publication Data
US 2008/0036204 A1 Feb. 14, 2008

Related U.S. Application Data

(62) Division of application No. 10/905,233, filed on Dec. 22, 2004, now abandoned.

(51) Int. Cl.
*B23K 13/01* (2006.01)
(52) U.S. Cl. ............... 219/607; 219/617; 285/285.1; 336/84 C
(58) Field of Classification Search ......... 219/603–617, 219/633–635, 670, 672–676; 285/256; 228/107; 336/84 C
See application file for complete search history.

(56) References Cited

U.S. PATENT DOCUMENTS

| | | | |
|---|---|---|---|
| 2,649,527 A * | 8/1953 | Chapman et al. ............ 219/611 |
| 2,687,904 A | 8/1954 | Thronblom | |
| 2,739,829 A * | 3/1956 | Pedlow et al. .............. 285/21.2 |
| 2,782,060 A | 2/1957 | Appleton | |
| 2,976,907 A | 3/1961 | Harvey et al. | |
| 3,210,842 A | 10/1965 | Schwinghamer | |
| 3,252,313 A | 5/1966 | Eilers et al. | |
| 3,313,536 A | 4/1967 | Eilers et al. | |
| 3,391,558 A | 7/1968 | Deeg | |
| 3,610,007 A | 10/1971 | Wildi | |
| 3,618,350 A | 11/1971 | Larrimer, Jr. et al. | |
| 3,654,787 A | 4/1972 | Brower | |
| 3,674,586 A | 7/1972 | Rimkus | |
| 3,703,958 A | 11/1972 | Kolm | |
| 3,837,755 A | 9/1974 | Benoit et al. | |
| 3,961,739 A | 6/1976 | Leftheris | |
| 3,998,081 A | 12/1976 | Hansen et al. | |
| 4,129,846 A * | 12/1978 | Yablochnikov ........... 336/84 C |
| 4,143,532 A | 3/1979 | Khimenko et al. | |

(Continued)

FOREIGN PATENT DOCUMENTS

EP        764 493 A1 *   3/1997

OTHER PUBLICATIONS

E. Diehl, et al., Long Precision Drift Tube Production at Michigan, Dept. of Physics University of Michigan, May 2002.

(Continued)

*Primary Examiner*—Quang T Van
(74) *Attorney, Agent, or Firm*—Ostrager Chong Flaherty & Broitman P.C.

(57) ABSTRACT

A metallurgically formed fluid circuit joint includes a hollow fitting (298), a tubular conduit (297), and a metallurgically formed tube/fitting mesh (296). The tube/fitting mesh (296) includes a fitting portion of the hollow fitting (298) and a tube portion of the tubular conduit (297) that is electromagnetically formed with the fitting portion.

16 Claims, 9 Drawing Sheets

U.S. PATENT DOCUMENTS

| | | | |
|---|---|---|---|
| 4,170,887 A | 10/1979 | Baranov | |
| 4,214,358 A | 7/1980 | Clerc | |
| 4,504,714 A | 3/1985 | Katzenstein | |
| 4,525,098 A | 6/1985 | Krude et al. | |
| 4,531,393 A | 7/1985 | Weir | |
| 4,702,543 A | 10/1987 | Hager | |
| 4,768,275 A | 9/1988 | Schmitz | |
| 4,807,351 A | 2/1989 | Berg et al. | |
| 4,947,462 A * | 8/1990 | Moe | 219/611 |
| 5,242,199 A | 9/1993 | Hann et al. | |
| 5,322,205 A | 6/1994 | Kato et al. | |
| 5,353,617 A | 10/1994 | Cherian et al. | |
| 5,442,846 A | 8/1995 | Snaper | |
| 5,549,335 A | 8/1996 | Wohrstein | |
| 5,586,460 A | 12/1996 | Steingroever | |
| 5,824,998 A | 10/1998 | Livshiz et al. | |
| 5,826,320 A | 10/1998 | Rathke et al. | |
| 5,836,070 A | 11/1998 | Arena | |
| 5,953,805 A | 9/1999 | Steingroever | |
| 5,964,127 A | 10/1999 | Steingroever | |
| 5,983,478 A | 11/1999 | Dolan et al. | |
| 5,992,898 A | 11/1999 | Saylor | |
| 6,065,317 A | 5/2000 | Steingroever | |
| 6,229,125 B1 | 5/2001 | Livshiz et al. | |
| 6,452,139 B1 | 9/2002 | Benoit et al. | |
| 6,619,701 B1 | 9/2003 | Udhofer | |
| 6,630,649 B1 | 10/2003 | Gafri et al. | |
| 7,015,435 B2 | 3/2006 | Yablochnikov | |
| 2003/0209536 A1 | 11/2003 | Golovashchenko et al. | |
| 2004/0173661 A1 * | 9/2004 | Yablochnikov | 228/107 |
| 2006/0208481 A1 | 9/2006 | Fischer et al. | |

OTHER PUBLICATIONS

Peihui Zhang, M.S., Joining Enabled by High Velocity Deformation, Dissertation, Ohio State University, 2003.

* cited by examiner

ELECTROMAGNETIC PULSE WELDING OF FLUID JOINTS

This application is a divisional application of U.S. application Ser. No. 10/905,233, filed Dec. 22, 2004 now abandoned.

RELATED APPLICATION

The present invention is related to U.S. patent application Ser. No. 10/905,331 entitled "Magnetic Field Concentrator for Electromagnetic Forming and Magnetic Pulse Welding of Fluid Joints", U.S. patent application Ser. No. 11/028,093 entitled "Electromagnetic Mechanical Pulse Forming of Fluid Joints for Low-Pressure Applications", and U.S. patent application Ser. No. 10/905,211 entitled "Electromagnetic Mechanical Pulse Forming of Fluid Joints for High-Pressure Applications", which are incorporated by reference herein.

TECHNICAL FIELD

The present invention generally relates to the solid state coupling of metallic tubes and fittings. More specifically, the present invention is related to a metallurgical coupling of the tubes and the fittings using magnetic interaction.

BACKGROUND ART

Metallic tubes are commonly used to carry fluid in the form of gas or liquid throughout various fluid circuits in many industries. This is especially true in the aerospace industry, due to the lightweight and strong mechanical features of the metallic tubes. For example, thin-walled aluminum and stainless steel tubing is often utilized within an aircraft to carry oxygen and hydraulic fluid for various applications, such as to breathing apparatuses and to and from vehicle brakes.

The fluid circuits typically contain a vast number of interlock joints, which reside between the tubing and the end fittings, such as ferrules. The current technique used to join the different sized tubes and ferrules, is referred to as a roller swaging process. During this process, a tube is inserted into a ferrule while the ferrule is constrained using a clamp. The tube is then expanded into the ferrule using a roller. The inner walls of the ferrule typically contain grooves within which the tube is expanded. An interlock is created between the tube and the ferrule due to the expansion and deformation of the tube against the inner walls and into the grooves of the ferrule.

Another technique that is commonly used to join metallic tubes to end fittings is referred to as Gas Tungsten Arc Welding (GTAW), which is a fusion welding process. The formed joints produced from fusion welding are often rejected by penetrant inspection, pressure testing, or by radiographic inspection and must be weld repaired. A weld formed joint may need to be repaired as many as three times, at significant costs.

A desire exists to increase the operating lifetime of a mechanical or fluid tight joint. Thus, there exists a need for an improved leak tight joint between a tube and a ferrule and a technique for forming the leak tight joint that may be applied to various fluid circuit applications. It is desirable that the improved technique be economical, have an associated quick production set-up time, and account for different sized tube and ferrule combinations.

SUMMARY OF THE INVENTION

The present invention satisfies the above-stated desires and provides a leak tight joint utilizing magnetic interactions to form a metallurgically formed tube/fitting mesh.

One embodiment of the present invention provides a metallurgically formed fluid circuit joint that includes a hollow fitting, a tubular conduit, and a metallurgically formed tube/fitting mesh. The tube/fitting mesh includes a fitting portion of the hollow fitting and a tube portion of the tubular conduit that is electromagnetically formed with the fitting portion.

The embodiments of the present invention provide several advantages. One such advantage is the provision of a metallurgically formed fitting and tube joint. Metallurgical forming or welding of a fitting and a tube provides a single component tube/fitting joint, wherein wall portions of the tube and the fitting are combined into a single shared welded wall element. The single welded element is leak tight since it is formed by the metallurgical combination of the walls of the tube and of the fitting.

Furthermore, the present invention provides joint forming techniques with improved repeatability, with quick assembly times, that do not require lubrication to form, and that have low associated scrap rates. The scrap rates, as a result of the joint forming techniques, is approximately zero.

Other features, benefits and advantages of the present invention will become apparent from the following description of the invention, when viewed in accordance with the attached drawings and appended claims.

DETAILED DESCRIPTION

In each of the following Figures, the same reference numerals are used to refer to the same components. While the present invention is described with respect to a system for magnetically forming a fluid joint and to the joints formed therefrom, the present invention may be adapted for various applications, such as air, liquid, and fluid applications. The present invention may be applied to both low-pressure applications, i.e. less than approximately 2500 psi, and high-pressure applications of greater than approximately 5000 psi, as well as to applications therebetween. The present invention may be applied to fluid applications in the aerospace, automotive, railway, and nautical or watercraft industries, as well as to other industries where fluid tight joints are utilized.

In the following description, various operating parameters and components are described for one constructed embodiment. These specific parameters and components are included as examples and are not meant to be limiting.

Also, in the following description the term "fitting" may refer to a ferrule, a nut, a union, or other fitting known in the art. A fitting may be magnetically formed or magnetically welded to or with a tubular conduit, as is described below.

Figure 1:
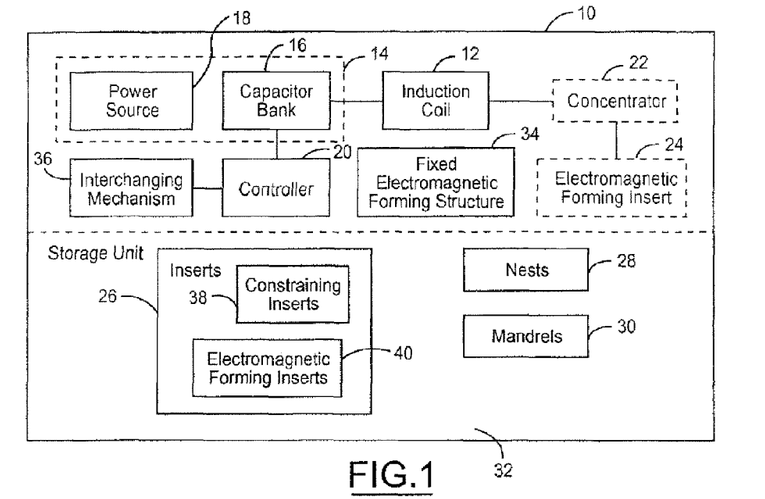
FIG. 1 is a block diagrammatic view of a magnetic forming system in accordance with an embodiment of the present invention.

Referring now to FIG. 1, a block diagrammatic view of a magnetic forming system 10 in accordance with an embodiment of the present invention is shown. The magnetic forming system 10 includes an induction coil 12 that is utilized to magnetically form a fluid joint between fluid carrying tubes and fittings, some examples of fluid joints, fluid carrying tubes, and fittings are shown in FIGS. 2A-10.

In operation, the induction coil 12 receives current generated from a current supply circuit 14 and generates an electromagnetic field, which is utilized to mechanically form and/or weld portions of a tube and a corresponding fitting to form a fluid joint. The current supply circuit 14 may include a capacitor bank 16 and a power source 18, as shown. A controller 20 is coupled to the capacitor bank 16, via transmission lines and buses (not shown), and controls charge and discharge thereof via the power source 18. The induction coil 12 may be coupled to a concentrator 22 and to an electromagnetic forming insert 24 for focusing electrical current within the induction coil 12. Features of the insert 24 are described in greater detail below. The controller 20 prior to forming a fluid joint may select from various inserts 26, nests 28, and mandrels 30, within a storage unit 32, that correspond to a particular tube and fitting combination, as will become more apparent in view of the following description. The selected insert and nest are fastened within a fixed electromagnetic forming structure 34 prior to electromagnetic forming of a tube and/or a fitting.

The concentrator 22 and electromagnetic forming insert 24 are used to adapt a compression coil, such as the induction coil 12, to a smaller diameter workpiece, having a smaller diameter than the induction coil. The concentrator 22 and the insert 24 concentrate the magnetically exerted pressure to a specific location on a tube and/or a fitting. When the capacitor bank 16 is discharged through the induction coil 12, the induced current in the magnetic field produces a magnetic pressure on the conductive tube and/or fitting. The amount of discharged power produces a sufficient amount of magnetic compressive or expansive pressure to conform and deform the tube and/or fitting.

The magnetic forming system 10 may include an interchanging device 36 that is coupled to the controller 20 and to the power source 18. The inserts 26, nests 28, and mandrels 30 may be manually selected or selected via the interchanging device 36 by the controller 20 for a particular fluid joint. The interchanging device 36 may be of various types and styles as known in the art for the selection, replacement, insertion, and coupling of the inserts 26, nests 28, and mandrels 30, as well as various tubes and fittings within the magnetic forming system 10. The interchanging device 36 may be in the form of an automated manufacturing system and have rails and motors for the selecting, rotating, coupling, inserting, sliding, and removing of inserts, nests, and mandrels during fluid joint production. The interchanging device 36 may be robotic in nature and have mechanical moving arms.

The controller 20 may be in the form of a control circuit and have switching devices for the control of the power settings utilized. The controller 20 may be microprocessor based such as a computer having a central processing unit, memory (RAM and/or ROM), and associated input and output buses. The controller 20 may be an application-specific integrated circuit or may be formed of other logic devices known in the art. The controller 20 may be a portion of a central main control unit, a control circuit, combined into a single integrated controller, or may be a stand-alone controller as shown.

The inserts 26 are generally toroidally shaped and include constraining inserts 38 and electromagnetic forming inserts 40. The constraining inserts 38 prevent outward expansion of the fittings and the tubes being formed. The electromagnetic forming inserts 40 are utilized to generate electromagnetic fields to cause the deformation of a tube and/or fitting to form a fluid joint. The electromagnetic inserts 40 may also constrain or limit outward expansion of a tube and/or fitting.

Note that the sizes, materials, and current outputs of the components of the induction coil 12 and of the current supply circuit 14 are different depending upon whether electromagnetic mechanical forming or metallurgical welding is performed. For example, in performing metallurgical welding the size and capacity of the capacitor bank and the size of the induction coil are generally larger than those used to perform electromagnetic mechanical forming, due to the larger amount of energy exerted in metallurgical welding. An exerted energy example is provided below with respect to the embodiment of FIGS. 2A and 2B.

The below described embodiments of FIGS. 2A-5B, are sample embodiments that may be utilized in the electromagnetic forming of the walls of a fitting and of a tube to form a fluid tight joint.

Figure 2A:
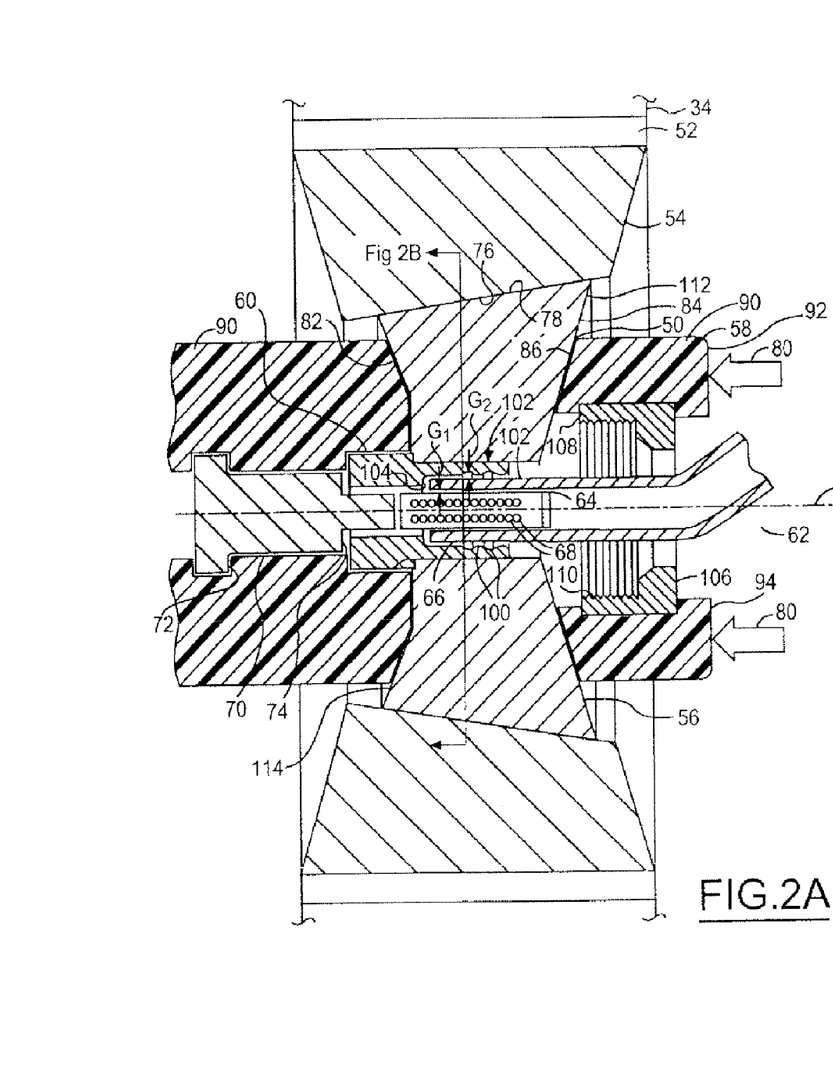
FIG. 2A is a cross-sectional side view of a insert/nest assembly that may be incorporated into the system of FIG. 1 in accordance with an embodiment of the present invention.
Figure 2B:
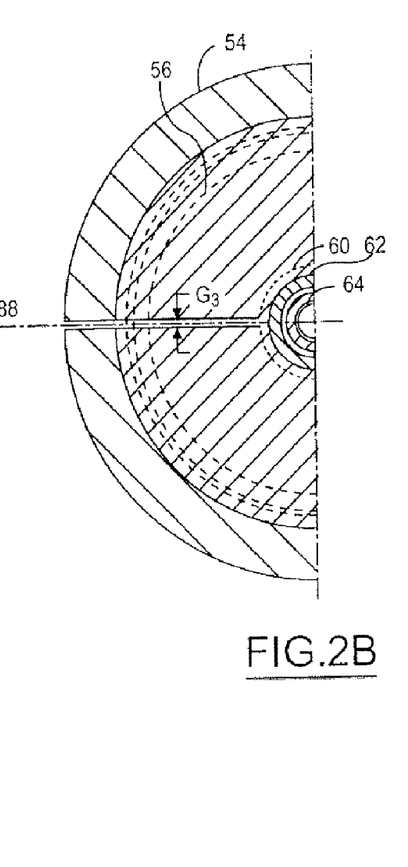
FIG. 2B is a front half cross-sectional view of the insert/nest assembly of FIG. 2A.

Referring now to FIGS. 2A and 2B, a cross-sectional side view of an insert/nest assembly 50 that may be incorporated into the fixed structure 34 and a front half cross-sectional view of the insert/nest assembly 50 are shown in accordance with an embodiment of the present invention. The insert/nest assembly 50 is attached to the fixed structure 34 via a fixed base 52 and a fixed receptacle 54. The base 52 is coupled within the fixed structure 34 and the receptacle 54 is coupled within the base 52. The base 52 and the receptacle 54 may be of similar size and shape as the induction coils and concentrators of the embodiments of FIGS. 3A-5B. A removable split constraining insert 56 is axially clamped within the receptacle 54 and is coupled within a removable split nest 58. The nest 58 holds a ferrule or fitting 60 and tube conduit 62 therein for magnetic forming thereof. An induction coil 64 resides within the tube 62. The induction coil 64 is used to generate an electromagnetic field to expand and deform the end 66 of the tube 62, such that a mechanically formed or metallurgically welded joint may be formed between the fitting 60 and the end 66.

A separation gap $G_1$ exists between the tube 62 and the induction coil 64 for assembly clearance. A fly distance gap $G_2$ resides between the fitting 60 and the tube 62, which allows for the acceleration of the material in the end 66 to be accelerated towards the fitting 60. In one sample embodiment the gaps $G_1$ and $G_2$ are approximately 0.05 inches in width.

The induction coil 64 has one or more coils 68 and may be of various sizes, shapes, and strengths and may be formed of various materials. For mechanical deformation of the end 66, the induction coil 64 may generate a current pulse having approximately 2 kJ of energy. Of course, other current pulses having other amounts of energy may be utilized depending upon the materials utilized, the sizes of the fittings and the tubes utilized, and other known parameters. For metallurgical welding of the fitting 60 with the end 66, the induction coil 64 may generate an energy pulse having approximately between 50-100 kJ. In one metallurgical welding embodiment of the present invention, the energy pulse is approximately 80 kJ. The induction coil 64 may have a handle portion 70 with a first step 72 and a second step 74, which may abut the nest 58 and the fitting 60, respectively.

The receptacle 54 and the insert 56 may be formed of various materials that allow for the outward constraining of the fitting 60 and the tube 62. The receptacle 54 and the insert 56 may be formed of stainless steel and are used to prevent or limit the outward expansion of the fitting 60 and the tube 62. The receptacle 54 includes a tapered inner surface 76 that corresponds with a tapered outer surface 78 of the insert 56, which allow for the clamping and proper securing of the insert 56 within the receptacle 54. Although the insert 60 is shown as having a tapered surface 76, which is axially clamped within the receptacle 54, the insert 60 may be coupled to the receptacle 54 utilizing other known coupling techniques. The axial clamping force applied to the insert 56 is represented by arrows 80.

The nest 58 may be of various sizes, shapes, and styles, and may be formed of various non-metallic materials. In one embodiment, the nest 58 is formed of plastic. The nest 58 holds the fitting 60 and the tube 62 in alignment. The nest 58 also holds the induction coil 64 in place for proper alignment with the fitting 60 and the tube 62.

The insert 56 also includes tapered sides 82 and 84 that correspond with an insert-angled channel 86 of the nest 58. The tapered sides 82 and 84 converge towards a centerline 88 of the nest 58. As the insert 56 is clamped into the receptacle 54, inward force is exerted on the walls 90 of the nest 58, which holds the upper half 92 and the lower half 94 of the nest 58 in place relative to each other. The left side 87 and the right side 89 of the nest 58 may be coupled to each other via fasteners extending therethrough in a circular pattern or via some other technique known in the art. The receptacle 54 and the insert 56 may be integrally formed as a single unit.

Figure 4A:
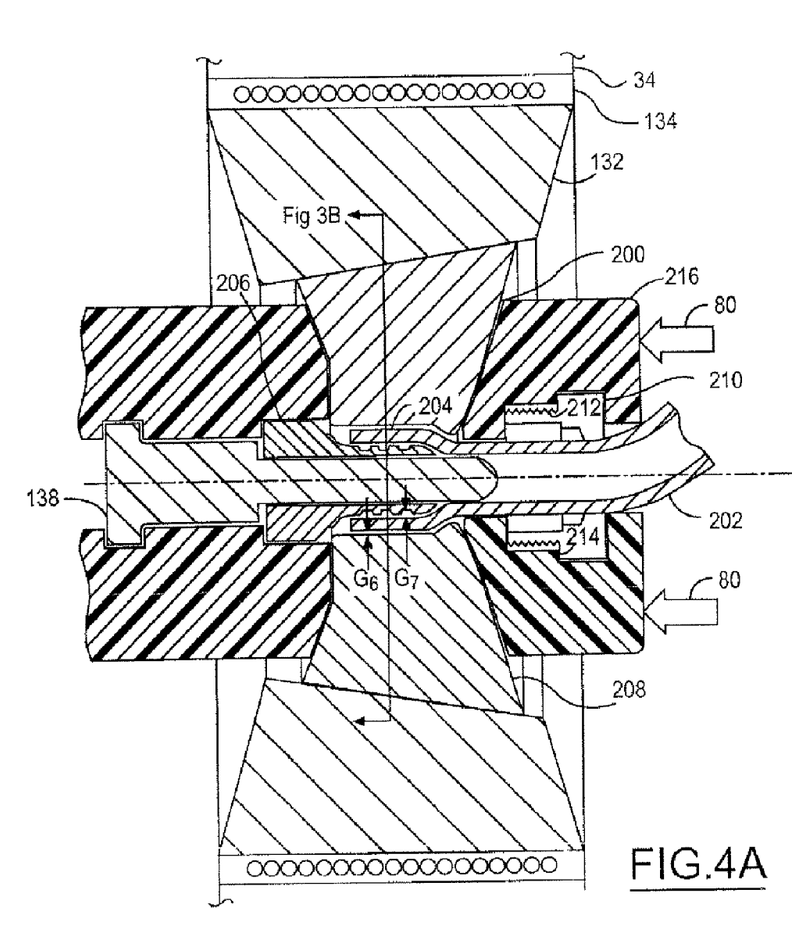
FIG. 4A is a cross-sectional side view of a insert/nest assembly that may be incorporated into the system of FIG. 1 in accordance with still another embodiment of the present invention.

The fitting 60 and the tube 62 may be formed of various metallic materials, such as aluminum, stainless steel, and titanium. The fitting 60 includes grooves 100, in a tube inlay section 101, in which the wall 102 of the tube 62 is deformed therein. This deformation into the grooves 100 provides a non-sealant based fluid tight seal. Although a non-sealant based fluid tight seal may be formed as suggested, sealants known in the art may be utilized, for example, an O-ring or an adhesive may be utilized between the fitting 60 and the tube 62. The tube end 66 may abut the fitting 60 at the inner step or tube-butting edge 104 of the fitting 60. The tube 62 is shown having a nut 106 for coupling to a union. The threads 108 of the nut 106 may reside on an internal surface 110 of the nut 106, as shown, or may reside on an external surface, as shown in FIG. 4A.

The insert 56 and nest 58 are split to provide ease in set-up and disassembling of the insert/nest assembly 50. The insert 56 includes an insert upper half 112 and an insert lower half 114. The nest 58, as stated above, includes the nest upper half 92 and the nest lower half 94. A gap $G_3$ resides between the upper halves 92 and 112 and the lower halves 94 and 114 for magnetic reaction.

Figure 3A:
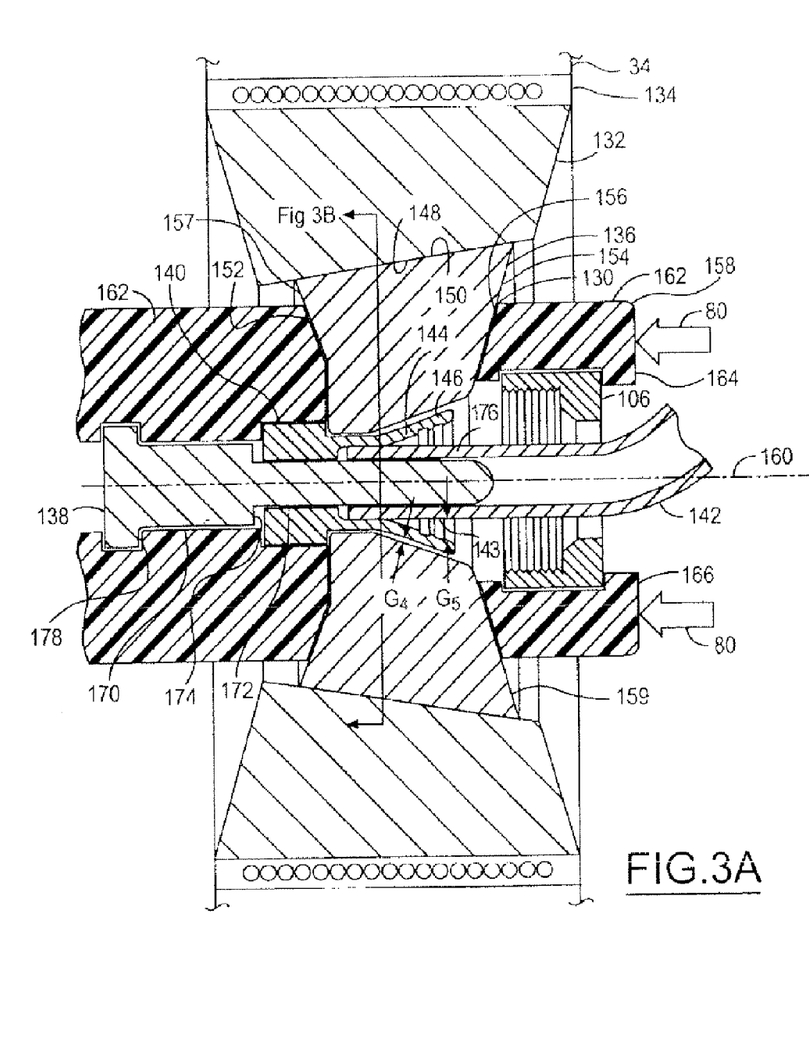
FIG. 3A is a cross-sectional side view of a insert/nest assembly that may be incorporated into the system of FIG. 1 in accordance with another embodiment of the present invention.
Figure 3B:
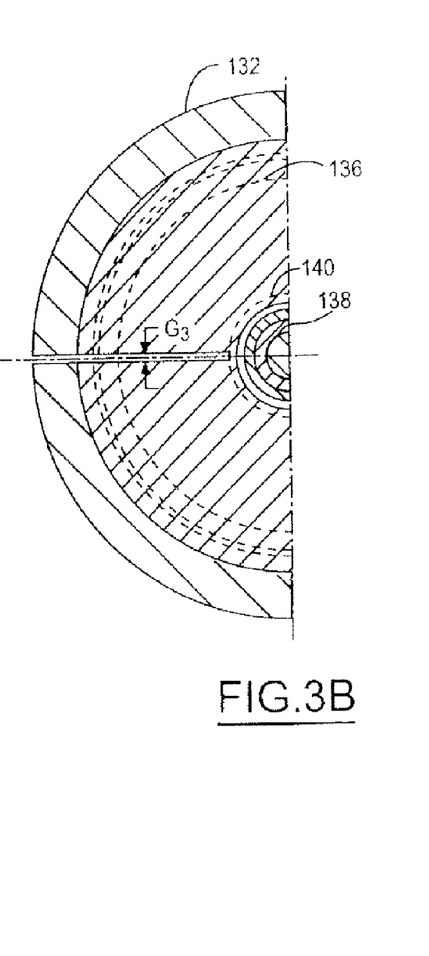
FIG. 3B is a front half cross-sectional view of the concentrator/nest assembly of FIG. 3A.

Referring now to FIGS. 3A and 3B, a cross-sectional side view of a insert/nest assembly 130 that may be incorporated into the fixed structure 34 and a front half cross-sectional view of the insert/nest assembly 130 are shown in accordance with another embodiment of the present invention. The insert/nest assembly 130 is coupled within a permanent or fixed concentrator 132, which in turn is coupled within a permanent or fixed induction coil 134. The insert/nest assembly 130 includes an electromagnetic forming insert 136 that resides within the concentrator 132. An inward constraining mandrel 138 resides within the fitting 140 and the tube 142.

A gap $G_3'$ resides between the upper halves 157 and 164 and the lower halves 159 and 166 for magnetic reaction. An assembly clearance gap $G_4$ resides between the insert 136 and the tube end 143. A fly distance gap $G_5$ resides between the fitting 140 and the tube 142, which allows for the material in the expanded portion 144 to be accelerated towards the tube 142.

In operation, current within the induction coil 134 is focused by the concentrator 132 and the insert 136 to generate an electromagnetic field, which is imposed on the fitting 140. The expanded portion 144 of the exterior wall 146 of the fitting 140 is compressed and accelerated towards the tube 142. The mandrel 138 limits the inward displacement of the fitting and the tube 142.

The concentrator 132 and the insert 136 may be formed of beryllium copper BeCu or the like. The concentrator 132 also has a tapered inner surface 148 that corresponds with a tapered outer surface 150 of the insert 136. The tapered surfaces 148 and 150 and the coupling therebetween allow for the clamping and the proper securing of the insert 136 within the concentrator 132. The tapered surfaces 148 and 150 assure a solid contact between the concentrator 132 and the insert 136, such that there is no arcing therebetween and also provides for proper operation of the associated magnetic forming system. The concentrator 132 and the insert 136 may be integrally formed as a single unit.

Like the insert 56, the insert 136 also includes tapered sides 152 and 154 that correspond with an insert-angled channel 156 of the nest 158. The tapered sides 152 and 154 converge towards a centerline 160 of the nest 158. As the insert 136 is clamped into the concentrator 132, inward force is exerted on the walls 162 of the nest 158, which holds the upper and lower halves 164 and 166 of the nest 158 in place relative to each other. The insert 136 includes an insert upper half 157 and an insert lower half 159.

The mandrel 138 has a handle portion 170 and an insert portion 172 with a step 174 therebetween. The insert portion 172 may be slightly tapered, although not shown, and is inserted within the fitting 140 and the tube 142. The outer edges 176 of the insert portion 172, when tapered, are tapered inward towards the centerline 160 away from the handle portion 170. The mandrel 138 may abut the nest 158 or the fitting 140 via the first step 178 or the second step 174, respectively. The mandrel 138 may, as an example, be formed of stainless steel and plastic.

Figure 4B:
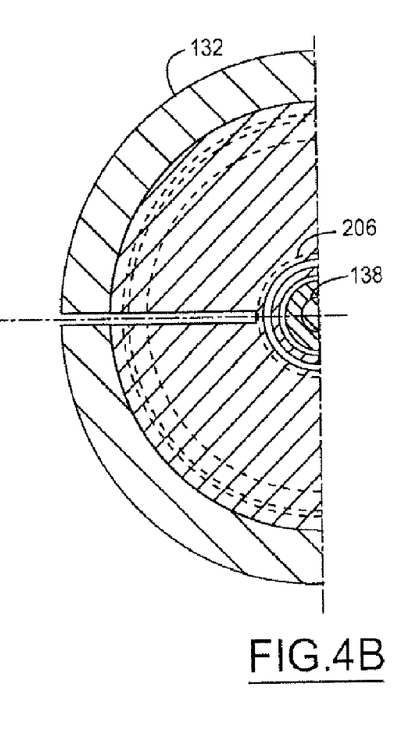
FIG. 4B is a front half cross-sectional view of the concentrator/nest assembly of FIG. 4A.

Referring now to FIGS. 4A and 4B, a cross-sectional side view of a insert/nest assembly 200 that may be incorporated into the fixed structure 34 and a front half cross-sectional view of the insert/nest assembly 200 are shown in accordance with still another embodiment of the present invention. The configuration of the insert/nest assembly 200 is similar to that of the insert/nest assembly 130. However, in the example embodiment of FIGS. 4A and 4B a tube 202 having an expanded end 204 is compressed onto a fitting 206, as opposed to a fitting being compressed onto a tube. Fitting features are described with respect to the embodiments of FIGS. 8-10. Thus, the electromagnetic forming insert 208 has a different shape than the insert 136 to accommodate for this difference in the tube/fitting relationship.

An assembly clearance gap $G_6$ resides between the tube 202 and the insert 208. A fly distance gap $G_7$ resides between the tube 202 and the fitting 206, respectively, which allows for the acceleration of the material in the expanded end 204 to be accelerated towards the fitting 206.

Note that the nut 210 on the tube 202 has threads 212 on an exterior side 214 as opposed to an interior side, as with the nut 106. There is no correlation between the overlap relationship of the fitting 206 and the tube 202 and the location of the threads 212. The threads 212 are shown on the exterior side 214 to illustrate another possible embodiment and another example as to the different internal shape of a nest. The nest 216 is shaped to accommodate the insert 208 and the nut 210.

Figure 5A:
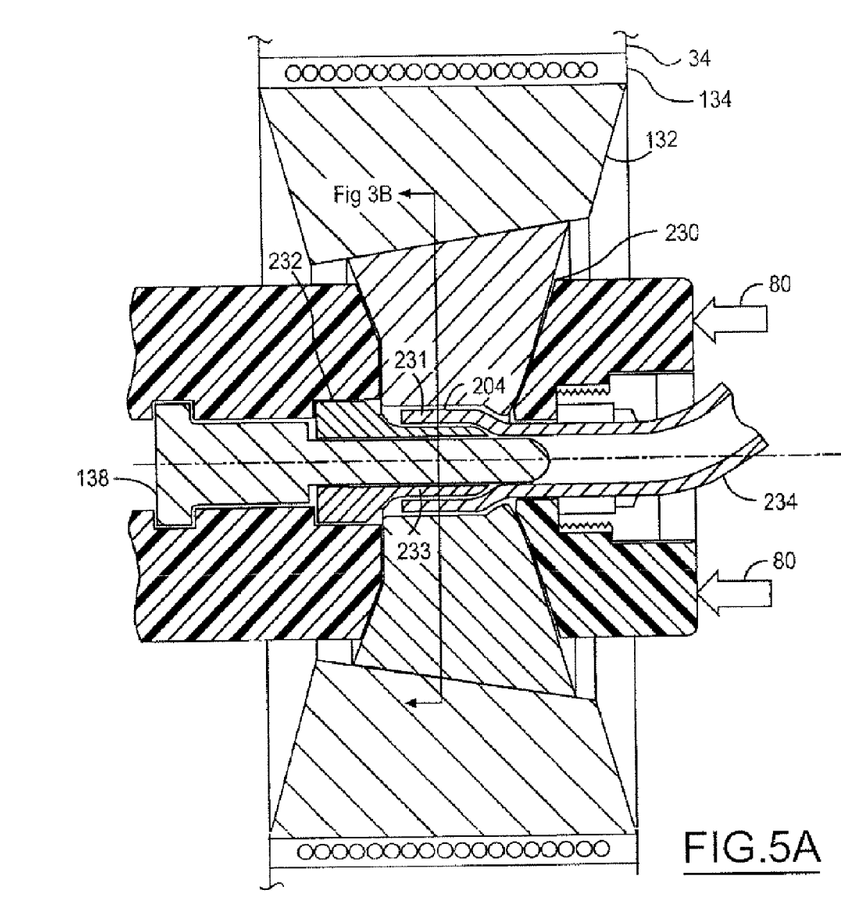
FIG. 5A is a cross-sectional side view of an insert/nest assembly that may be incorporated into the system of FIG. 1 in accordance with another embodiment of the present invention.
Figure 5B:
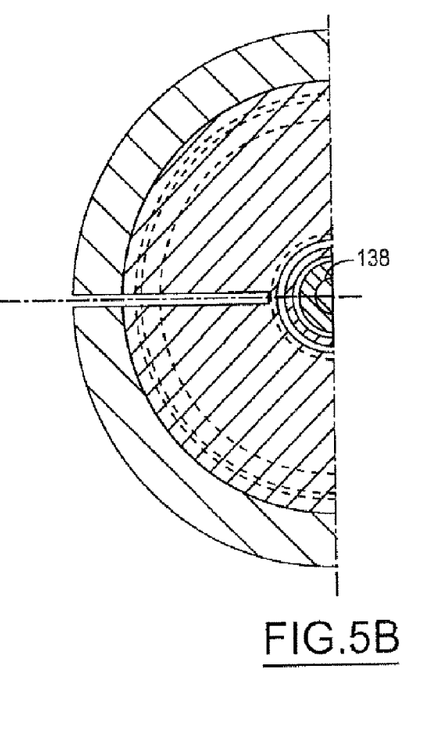
FIG. 5B is a front half cross-sectional view of the concentrator/nest assembly of FIG. 5A.

Referring now to FIGS. 5A and 5B, a cross-sectional side view of an insert/nest assembly 230 that may be incorporated into the fixed structure 34 and a front half cross-sectional view of the insert/nest assembly 230 are shown in accordance with another embodiment of the present invention. In operation, the insert/nest assembly is used to metallurgically combine the tube wall portion 231 and the fitting wall portion 233 to form a tube/fitting mesh, as shown in FIG. 7C.

The embodiment of FIGS. 5A and 5B is similar to that of FIGS. 4A and 4B. However, the fitting 232 does not include grooves. Although metallurgical welding may be applied to any of the configurations of FIGS. 2A-5B, FIGS. 5A and 5B illustrate that since the walls of a fitting and of a tube are metallurgically combined, that fittings and tubes without grooves may be utilized in the metallurgical welding process to form fluid tight joints.

The fittings 140, 206 and 232 and the tubes 142, 202, and 234 may be formed of similar materials as the fitting 60 and the tubes 62.

Figures 6, 8:
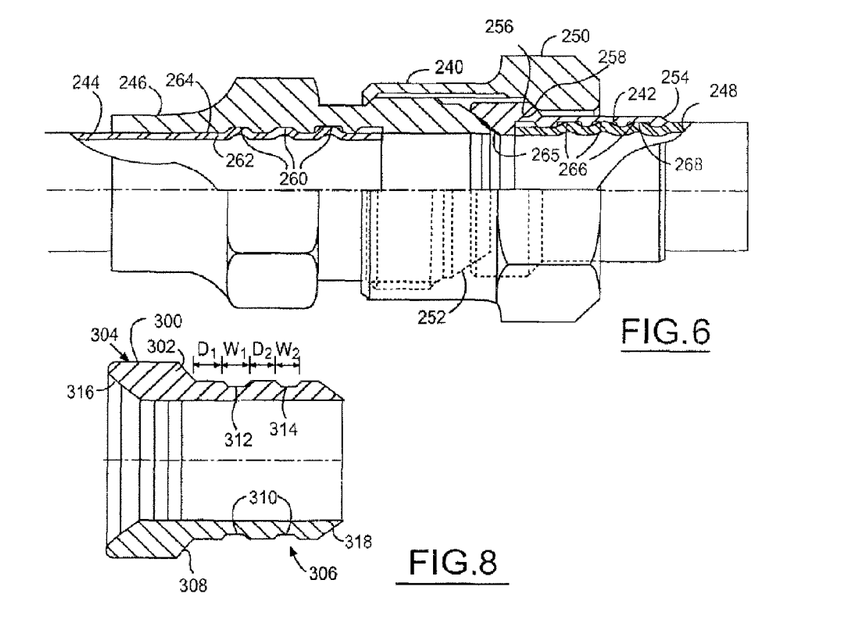
FIG. 6 is a side cut-away view of a tube/fitting coupling incorporating a tube/fitting joint formed using the assemblies of FIG. 2A or 3A.
FIG. 8 is a cross-sectional side view of a sample fluid carrying ferrule in accordance with an embodiment of the present invention.

Referring now to FIG. 6, a side cut-away view of a tube/fitting coupling 240 is shown, incorporating a tube/fitting fluid joint 242 formed using one of the insert/nest assemblies 50 and 130. The fluid joint 242 is a non-sealant based fluid tight seal, as well as other fluid joints herein described. The tube/fitting coupling 240 includes a first tube 244 having a union 246 residing thereon and a second tube 248 having a nut 250. In connecting the first tube 244 to the second tube 248 the nut 250 is threaded onto the union 246. The tip 252 of the union 246 is pressed into the ferrule 254 due to the coupling between the nut 250 and the ferrule 254 and the threading of the nut 250 onto the union 246. The nut 250 includes a ferrule-chamfered surface 256 that corresponds with a middle tapered exterior surface 258 of the ferrule 254. As the nut 250 is threaded onto the union 246 the nut 250 pulls the union 246 into the ferrule 254.

The union 246 may include grooves 260 on an interior surface 262. A first end 264 of the first tube 244 may be expanded and formed into the grooves 260 using a magnetic forming or magnetic welding process as described herein. The ferrule 254 resides between the nut 250 and the union 246 and is coupled to the second tube 248 via a magnetic forming or magnetic welding process of the present invention, such as that described in the embodiments of FIGS. 2A-3B.

The ferrule 254 includes a union chamfered surface 264 in which the tapered tip 252 resides when coupled to the ferrule 254. The ferrule 254 also includes multiple grooves 266 on an interior side 268 for forming of the second tube 248 therein.

Figure 7A:
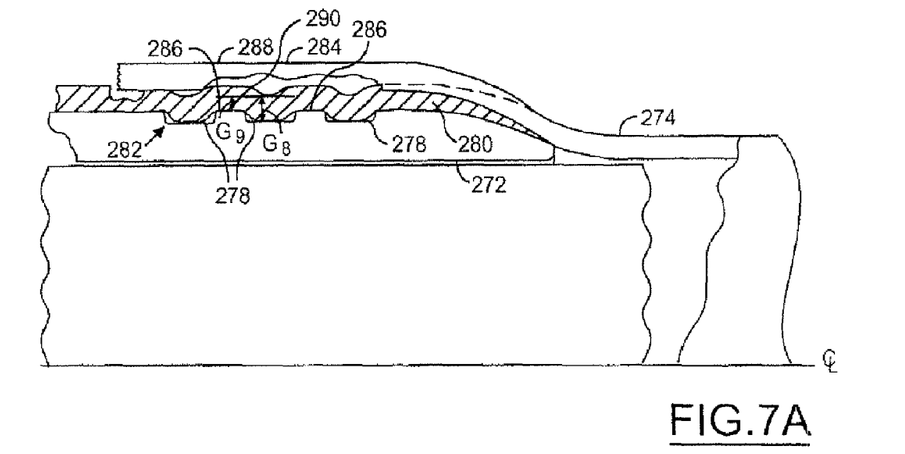
FIG. 7A is a half-side cross-sectional view of a tube/fitting coupling incorporating a tube/fitting joint prior and subsequent to magnetic formation using the assembly of FIG. 4A.
Figure 7B:
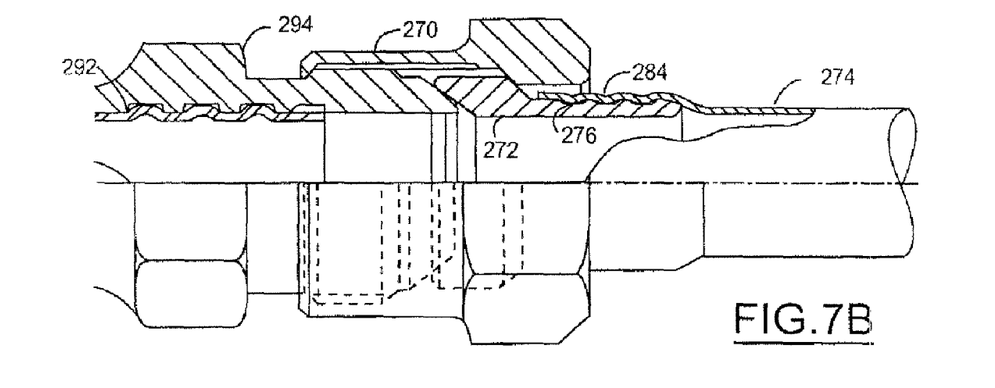
FIG. 7B is a side cut-away view of a tube/fitting coupling incorporating a tube/fitting joint subsequent to magnetic formation using the assembly of FIG. 4A.
Figure 7C:
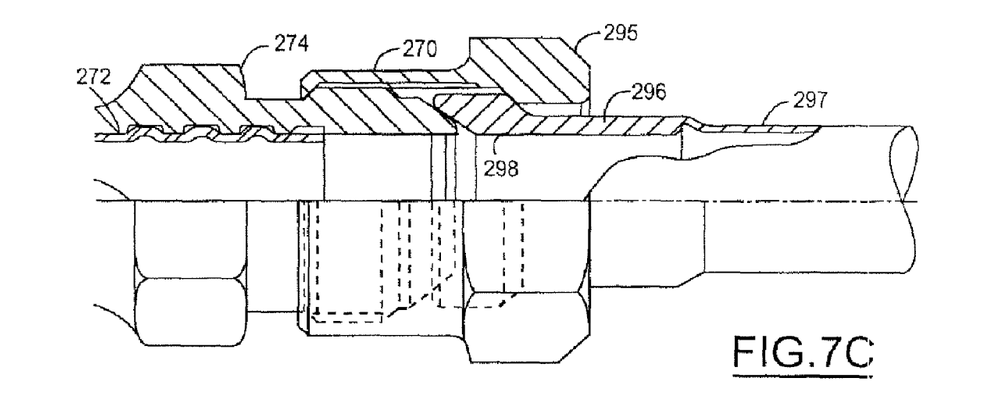
FIG. 7C is a side cut-away view of a tube-fitting coupling subsequent to metallurgical formation using the assembly of FIG. 5A.

Referring now to FIGS. 7A and 7B, a half-side cross-sectional view of a tube/fitting coupling 270 is shown prior and subsequent to magnetic formation using the assembly of FIG. 4A, along with a side cut-away view of the tube/fitting coupling 270 subsequent to magnetic formation.

The tube/fitting coupling 270 includes a first tube 292 and a second tube 274. The second tube 274 is coupled to a fitting 272 via a fluid tight joint 276 therebetween. The fitting 272 includes multiple grooves 278 that are located on an exterior side 280 of the fitting 272 in a tube overlap region 282. The tube 274 has an end portion 284 that overlaps the fitting 272. The end portion 284 is expanded prior to being slid over the overlap region 282. Fly distance gaps $G_8$ and $G_9$ exist between the overlap region 282 and the end portion 284. The fly distance gaps $G_8$ and $G_9$ exist between the grooves 278 and the end portion 284 and between the end portion 284 and the ribs 286, respectively.

In FIG. 7A, the end portion 284 is shown in a first position 288, representing the end portion 284 prior to magnetic forming, and in a second position 290, representing the end portion 284 subsequent to magnetic forming. During magnetic forming the end portion 284 is formed into the grooves 278. The bent sections of the end portion 284 may be referred to as electromagnetic field formed wall deformations. Three such sections 291 are shown.

In FIG. 7B, the tube/fitting coupling 270 is shown illustrating the union coupling between the first tube 292 and the second tube 274. The tube/fitting coupling 270 includes the first tube 292 and the union 294, which are similar to the first tube 244 and the union 246. The first tube 292 and the union 294 are coupled to the second tube 274 and to the ferrule 272.

Referring now to FIG. 7C, a side cut-away view of a tube/fitting coupling 295 subsequent to metallurgical formation. The tube/fitting coupling 295 includes a tube/fitting mesh 296 that is a metallurgically formed fluid circuit joint, which is in the form of a shared wall section between a tube 297 and a ferrule 298. The tube/fitting mesh 296 includes materials from wall portions of the tube 297 and the ferrule 298.

Although metallurgical welding may be applied to any of the configurations of FIGS. 2A-4B, since the walls of the fitting and of the tube are metallurgically combined, a fitting and a tube that do not contain any grooves may be utilized in the metallurgical welding process to form a fluid tight joint.

The embodiments of FIGS. 2A-5B may be applied to low-pressure fluid applications to form the tube/fitting joints of FIGS. 6-7C. The tube/fitting joints of FIGS. 6-7C when containing thin-walled tubes and/or fittings are capable of withstanding internal fluid pressures of approximately equal to or less than 2500 psi and thus have a fluid pressure rating as such. An example of a thin-walled tube is one in which the thickness of the tube wall is approximately less than 0.1 multiplied by the average radius of the tube.

Referring now to FIG. 8, a cross-sectional side view of a sample fluid-carrying ferrule 300 in accordance with an embodiment of the present invention is shown. The fluid-carrying ferrule 300 includes a wall 302 having a fluid-union coupling region 304 and a tube overlap region 306. A tube end, not shown, may reside over the overlap region 306 and abut the step 308 of the wall 302.

The overlap region 306 includes multiple grooves 310. Although two grooves are shown having a particular shape and size, any number of grooves, having various sizes and shapes may be utilized, depending upon the application. Each groove 310 provides an additional fluid tight transition for additional leak prevention.

In the embodiment shown, the overlap region 306 includes a first groove 312 and a second groove 314. The first groove 312 is slightly wider than the second groove 314. There is approximately equal distance between the step 308 and the first groove 312 as between the first groove 312 and the second groove 314. The widths $W_1$ and $W_2$ of the grooves 310 may be approximately equal to the separation distances $D_1$ and $D_2$ between the step 308 and the grooves 310.

The ferrule 300 also includes a chamfered inner surface 316 for coupling to a union, such as unions 246 and 294. The ferrule 300 further includes, within the overlap region 306 a break edge 318, which allows for easy insertion into a tubular conduit.

Figure 9:
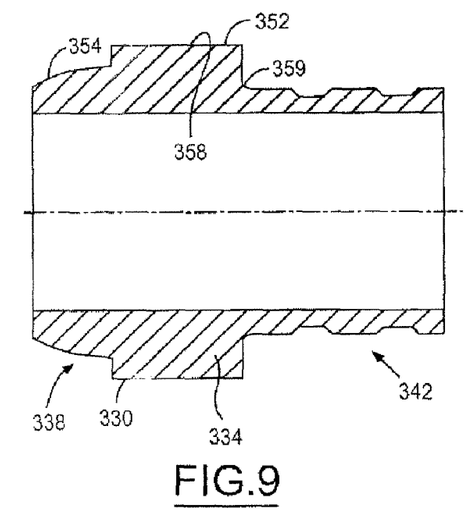
FIG. 9 is a cross-sectional side view of a sample hydraulic fluid carrying ferrule in accordance with an embodiment of the present invention.
Figure 10:
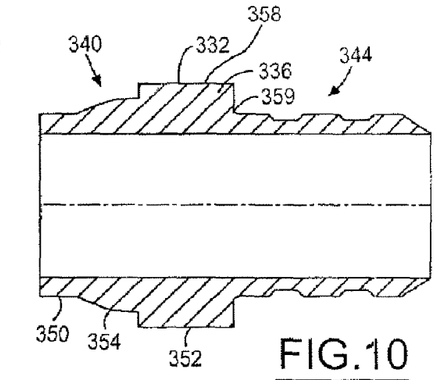
FIG. 10 is a cross-sectional side view of another sample hydraulic fluid carrying ferrule in accordance with another embodiment of the present invention.

Referring now to FIGS. 9 and 10, cross-sectional side views of sample hydraulic fluid carrying ferrules 330 and 332 are shown in accordance with an embodiment of the present invention. The hydraulic ferrules 330 and 332 include walls 334 and 336 having hydraulic union coupling regions 338 and 340 and tube overlap regions 342 and 344.

The hydraulic-coupling regions 338 and 340 are different than that of the air-coupling region 304 to accommodate for the different application. The hydraulic-coupling regions 338 and 340 may include a standard wall section 350, steps 352, and arched sections 354. The steps 352 also include radius edges 359 that are associated with an end of a tubular conduit (not shown).

The tube overlap regions 342 and 344 are similar to the tube overlap region 306. The tube overlap regions 342 and 344 may or may not have a break edge.

Figures 11, 12:
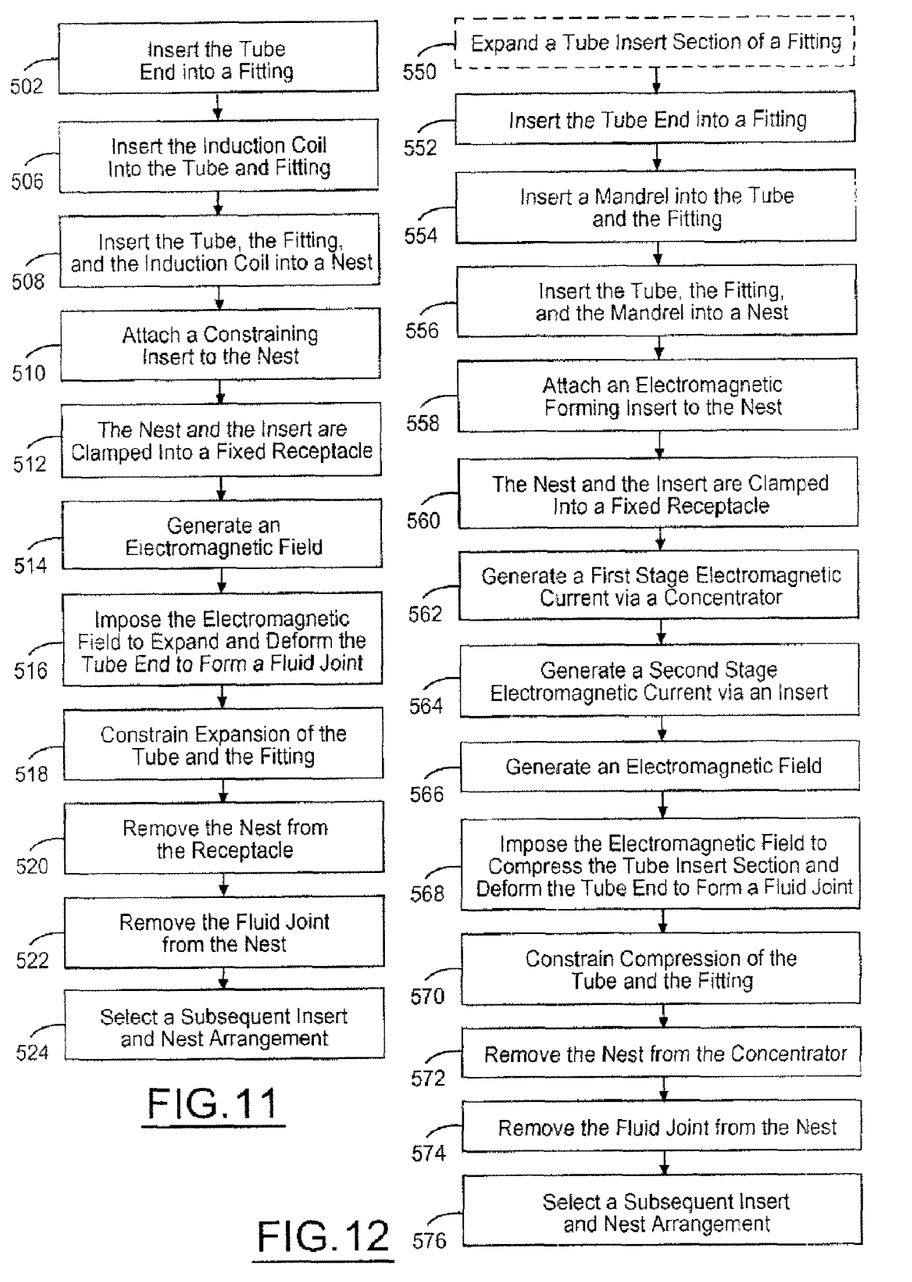
FIG. 11 is a first sample method of magnetically forming a fluid joint in accordance with an embodiment of the present invention.
FIG. 12 is a second sample method of magnetically forming a fluid joint in accordance with another embodiment of the present invention.
Figure 13:
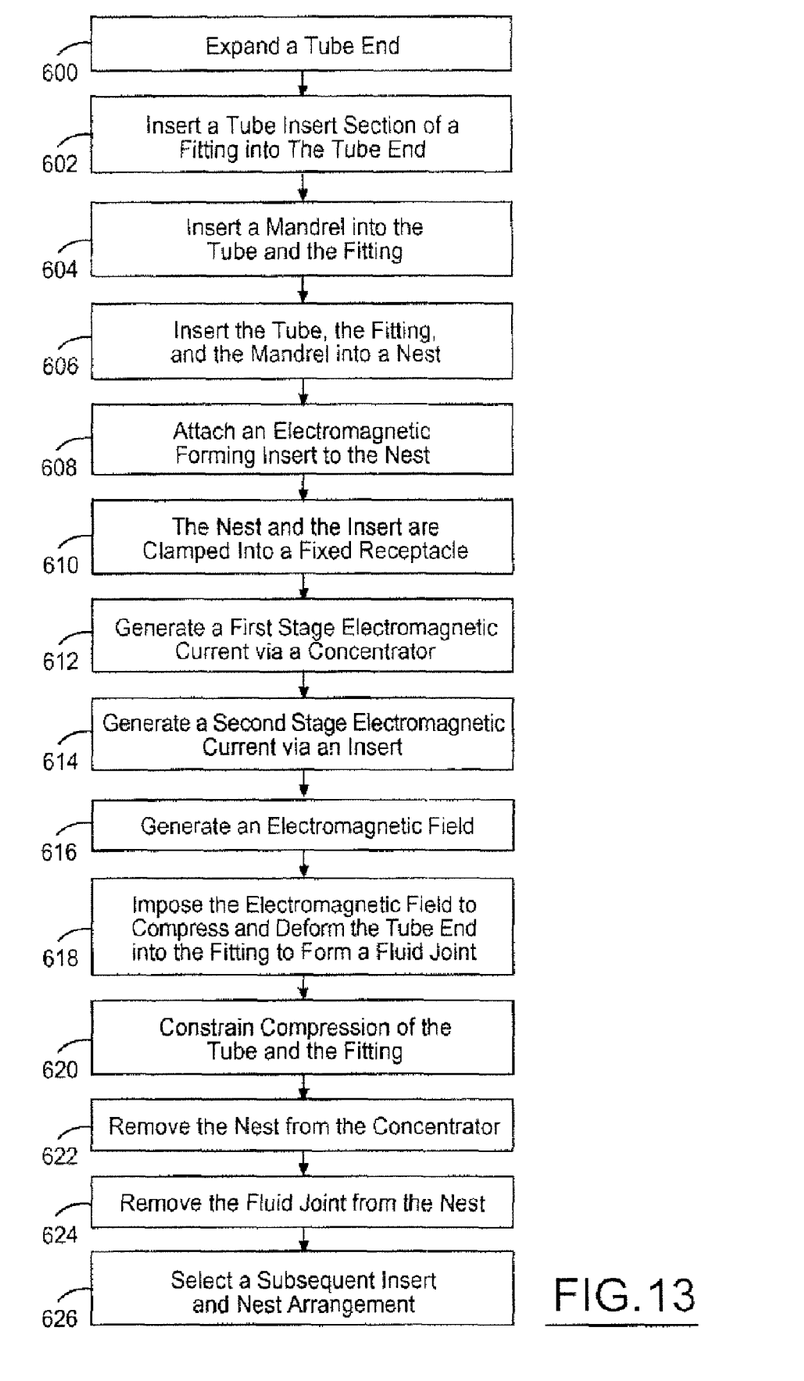
FIG. 13 is a third sample method of magnetically forming a fluid joint in accordance with still another embodiment of the present invention.

In the methods of FIGS. 11-13, the material compositions of the tubes and the fittings utilized can affect the ability of the tubes and or the fittings to be deformed. As an example, when it is desired for a fitting to be deformed as opposed to a tube, the material composition of the fitting may be adjusted and/or have less tensile strength than that of the tube to allow for such deformation. The thickness of the tube and fitting walls may also be adjusted to provide various degrees of tensile strength. In addition, the electromagnetic current pulses utilized may also be adjusted to provide the desired deformation in the tube and the fitting.

Referring now to FIG. 11, a first sample method of magnetically forming a fluid joint in accordance with an embodiment of the present invention is shown.

In step 502, the current tube is inserted into the current fitting. The tube may be inserted into the fitting manually or through use of the interchanging device 36. In step 506, the induction coil is inserted into the current tube.

In step 508, inserting the current tube, the current fitting, and the induction coil into a nest. The current tube, the current fitting, and the induction coil are placed on a first half of a selected nest, such as the nest half 92. The nest may be selected from the nests 28. The second half of the nest, such as the nest half 94, is placed over the first half covering the fitting, the tube, and the induction coil.

In step 510, an insert, such as one of the constraining inserts 38 or the constraining insert 56, is attached and/or inserted into the nest.

In step 512, the nest and the insert are clamped into a fixed receptacle, such as the receptacle 54. The insert is press fitted into the receptacle using techniques known in the art.

In step 514, a controller, such as the controller 20, via a capacitor bank and the induction coil generates an electromagnetic field. An electromagnetic current is discharged from the capacitor bank into the induction coil in response to a current pulse signal generated from the controller 20.

In step 516, the induction coil in generating the electromagnetic field imposes the electromagnetic field upon the tube. The electromagnetic field accelerates the end of the tube toward the fitting, thereby expanding the end of the tube within the fitting and deforming the end into the grooves, such as the grooves 100, of the fitting. The fly distance gap, such as the gap $G_2$, between the tube and the fitting allow for the acceleration of the tube end. The expansion and deformation of the tube end against the fitting forms a pressure tight fluid joint.

Electrical current from the capacitor bank is passed through the induction coil, which generates an intense electromagnetic field and creates high magnitude eddy currents in the tube end. The opposing magnetic fields that are directly generated by the induction coil and that are generated by the eddy currents accelerate the tube end towards the fitting. When electromagnetic mechanical forming is performed the tube end is deformed into the grooves of the fitting. When electromagnetic welding is performed the tube end is metallurgically welded with the fitting.

A high current pulse of short duration, approximately between about 10 and 100 microseconds, is introduced to the coils of the induction coil, which generates the electromagnetic field to instantaneously deform the tube radially outward towards the insert, resulting in the crimping or metallurgical welding of the tube to the fitting to form the fluid joint. The pulse is strong enough to induce magnetic forces above the yield strength of the material in the tube.

In step 518, the insert and the receptacle, during electromagnetic forming of the tube, constrain or limit the expansion of the tube and the fitting. Steps 514-518 are substantially performed simultaneously.

In step 520, upon completion of steps 514-518 the current nest is removed from the receptacle containing the fluid joint. In step 522, the fluid joint is removed from the current nest. The first half and the second half of the current nest are separated to allow for the removal of the fluid joint.

In step 524, it is determined whether the current setup and configuration of the current tube and the current fitting is to be reused or replaced. The controller may determine whether to form another tube/fitting coupling using the current insert and nest arrangement or to select a replacement insert and nest. The replacement insert and nest may have different internal dimensions as compared with the current insert and nest and may be selected from the constraining inserts 38 and the nests 28. The different internal dimensions may correspond to a tube/fitting coupling of different size, to a tube/fitting coupling having a different tube/fitting configuration, to a tube/fitting coupling formed using a different electromagnetic forming or electromagnetic welding technique, or to other known tube/fitting related differences known in the art. Steps 520-524 may be performed via the interchanging mechanism 36. Upon selection of a second or replacement tube, a second or replacement fitting, a replacement insert, and a replacement nest, the controller 20 returns to step 502.

Referring now to FIG. 12, a second sample method of magnetically forming a fluid joint in accordance with another embodiment of the present invention is shown.

In step 550, a tube insert section or portion of a current fitting, such as the portion 144, may be expanded also via an end-forming device or originally machined with a tapered shape. In step 552, a tube end of a current tube, such as the tube end 143, is inserted into the fitting. In step 554, a temporary mandrel is selected, such as the mandrel 176, and is inserted into the tube and the fitting. The mandrel is inserted into the tube to prevent excessive tube-wall collapse.

In step 556, the tube, the fitting, and the mandrel are inserted into a current nest, such as the nest 166. The tube, the fitting, and the mandrel are placed on a first half of the nest. The second half of the nest is placed over the first half covering the fitting, the tube, and the mandrel. In step 558, an insert, such as one of the electromagnetic forming inserts 40 or the electromagnetic forming insert 136, is attached and/or inserted into the nest.

In step 560, the nest and the insert are clamped into a fixed concentrator, such as the concentrator 132. The insert is press fitted into the concentrator using techniques known in the art.

In step 562, the controller 20, via a capacitor bank and an induction coil, such as the induction coil 134, generates a first stage electromagnetic current that is passed into the concentrator via coupling between the concentrator and the induction coil. An electromagnetic current is discharged from the capacitor bank into the induction coil, which is then passed into the concentrator. In step 564, a field concentrator focuses the first stage electromagnetic current to form a second stage electromagnetic current, which is passed into the insert via the coupling between the concentrator and the insert. In step 566, the insert focuses the second stage electromagnetic current and forms an electromagnetic field.

In step 568, the electromagnetic field is imposed upon the exterior of the fitting and accelerates and compresses the tube insert section onto the tube. In accelerating and compressing the fitting onto the tube, the tube end is deformed into the grooves of the fitting. The fly distance gap, between the insert and the tube, such as the gap $G_5$, allows for the acceleration of the tube insert section of the fitting. The compression of the fitting and the deformation of the tube form a fluid joint. In step 570, the mandrel constrains or limits the compression of the fitting and the tube during electromagnetic formation. Steps 562-570 are substantially performed simultaneously.

In step 572, upon completion of steps 562-570 the current nest is removed from the concentrator containing the fluid joint. In step 574, the fluid joint is removed from the current nest. The first half and the second half of the current nest are separated to allow for the removal of the fluid joint.

In step 576, it is determined whether the current setup and configuration of the current tube and the current fitting is to be reused or replaced, similar to step 524 above. The controller may determine whether to form another tube/fitting coupling using the current insert and nest arrangement or to select a replacement insert and nest. Steps 572-576 may be performed via the interchanging mechanism. Upon selection of a second or replacement tube, a second or replacement fitting, a replacement insert, and a replacement nest, the controller returns to step 550.

Referring now to FIG. 13, a third sample method of magnetically forming a fluid joint in accordance with still another embodiment of the present invention is shown.

In step 600, a current tube end, such as the tube end 204, is expanded using an end-forming device. In step 602, a current fitting, such as the fitting 206 or the fitting 272, is inserted into the tube end. In step 604, a mandrel, such as the mandrel 138, is inserted into the tube and the fitting.

In step 606, the tube, the fitting, and the mandrel are inserted into a current nest, such as the nest 216. The tube, the fitting, and the mandrel are placed on a first half of the nest. The second half of the nest is placed over the first half covering the fitting, the tube, and the mandrel.

In step 608, an insert, such as one of the electromagnetic forming inserts 40 or the electromagnetic forming insert 208, is attached and/or inserted into the nest. In step 610, the nest and the insert are clamped into a fixed concentrator, such as the concentrator 132. The insert is press fitted into the concentrator using techniques known in the art.

In step 612, the controller 20, via the capacitor bank and the induction coil, such as the induction coil 134, generates a first stage electromagnetic current that is passed into the concentrator via coupling between the concentrator and the induction coil. An electromagnetic current is discharged from the capacitor bank into the induction coil, which is then passed into the concentrator. In step 614, the field concentrator focuses the first stage electromagnetic current to form a second stage electromagnetic current, which is passed into the insert via the coupling between the concentrator and the insert. In step 616, the insert focuses the second stage electromagnetic current and forms an electromagnetic field.

In step 618, the electromagnetic field is imposed upon the exterior of the tube and accelerates and compresses the tube end onto the fitting, similar to step 568 above. In accelerating and compressing the tube onto the fitting, the tube end is deformed into the grooves of the fitting. The fly distance gap between the insert and the tube, such as the gap $G_7$, allows for the acceleration of the tube end. The compression and deformation of the tube end forms a fluid joint. In step 620, the mandrel constrains or limits the compression of the fitting and the tube during electromagnetic formation. Steps 612-620 are substantially performed simultaneously.

In step 622, upon completion of steps 612-620 the current nest is removed from the concentrator containing the fluid joint. In step 624, the fluid joint is removed from the current nest. The first half and the second half of the current nest are separated to allow for the removal of the fluid joint.

In step 626, it is determined whether the current setup and configuration of the current tube and the current fitting is to be reused or replaced, similar to steps 524 and 576 above. The controller may determine whether to form another tube/fitting coupling using the current insert and nest arrangement or to select a replacement insert and nest. Steps 612-626 may be performed via the interchanging mechanism. Upon selection of a second or replacement tube, a second or replacement fitting, a replacement insert, and a replacement nest, the controller returns to step 600.

Note that the above methods may be performed without the use of lubrication, which minimizes steps involved and can eliminate the need for cleaning of the fittings, tubes, and fluid tight joints.

The above-described steps in the methods of FIGS. 11-13 are meant to be illustrative examples; the steps may be performed sequentially, synchronously, simultaneously, or in a different order depending upon the application.

Figure 14:
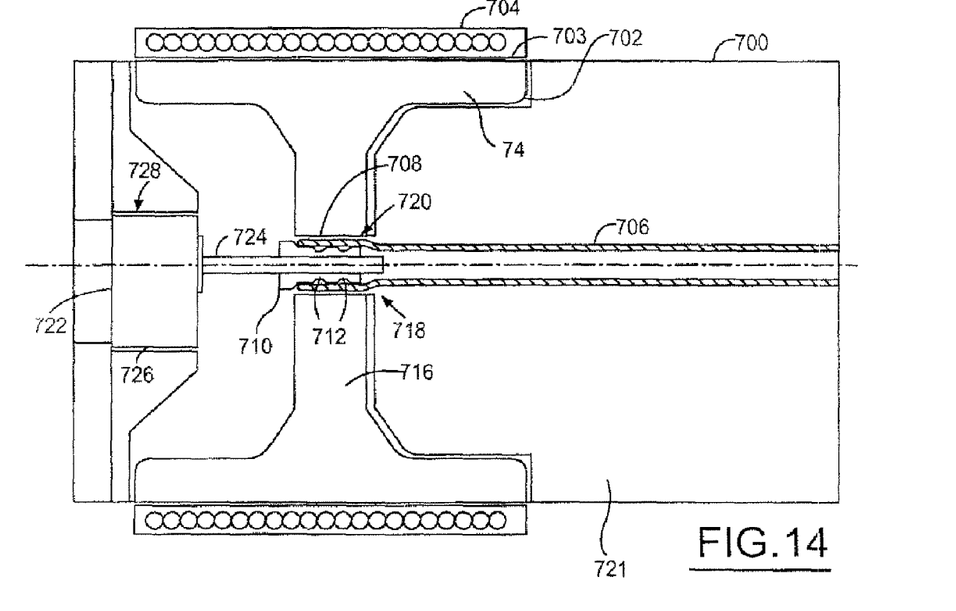
FIG. 14 is a cross-sectional side view of another insert/nest assembly that may be incorporated into the system of FIG. 1 in accordance with still another embodiment of the present invention.

Referring now to FIG. 14, a cross-sectional side view of another insert/nest assembly that may be incorporated into the system of FIG. 1 in accordance with still another embodiment of the present invention is shown. The insert/nest assembly 700 utilizes a field shaper 702 as opposed to a concentrator and an insert, as described above. The insert/nest assembly includes a first half (shown) as well as a second half (not shown), which is a mirror image of the first half. The field shaper 702 is coupled to an induction coil 704. An insulation layer 703 may reside between the field shaper 702 and the induction coil 704. The induction coil 704 generates an electromagnetic field, which is imposed on the tube 706 via the field shaper 702. The electromagnetic field accelerates the end 708 of the tube 706 toward the fitting 710, thereby compressing the end 708 within the grooves 712 of the fitting 710.

The field shaper 702 may be formed of materials similar to that of the field concentrators and inserts described above. The cross-section of the field shaper 702 is "I"-shaped. The field shaper includes an outer ring 714 and a main center disc 716 that extends inward toward a tube/fitting forming region 718. The center disc 716 has a semi-circular opening 720 in the tube/fitting forming region 718. The field shaper 702 resides within a nest 721, which has internal dimensions and geometry that correspond to that of the field shaper 702 such that the field shaper 702 is held fixed in place during electromagnetic forming. The nest 721 may be formed of the nest materials stated above, such as plastic.

A mandrel 722 resides within the nest 721 and includes a stem 724, which is inserted into the tube 706 and the fitting 710 through the tube/fitting forming region 718. The stem 724 is coupled to a handle 726, which resides in a recessed portion 728 of the nest 721. In one example embodiment, the stem 724 is formed of stainless steel and the handle 726 is formed of plastic.

The present invention provides fluid tight leak joints with reduced scrap rate. Further, because the insert/nest assemblies are quickly and easily inserted and removed from a fixed structure, a large quantity of tubular joints may be quickly formed. The above stated reduces costs associated with manufacturing down times.

The present invention reduces manufacturing processing steps as compared to conventional welding and roller swaging or elastomeric processes. The present invention also reduces inspection process steps, cost of production, and provides a highly reproducible manufacturing process to maintain consistent quality.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A magnetic forming system for creating a non-sealant based metallurgically formed fluid circuit joint between a wall of the end portion of a metal tube and the wall of a fitting portion of a hollow metal fitting wherein said tubular portion is partially inserted into said fitting portion of said metal fitting whereby the wall portions of the tube and the fitting are combined into a single shared wall element comprising:
    an induction coil forming an electromagnetic current; and
    a field concentrator assembly electrically coupled to said induction coil and forming an electromagnetic field in response to said electromagnetic current, said field concentrator assembly comprising:
    a field concentrator focusing said electromagnetic current to form said electromagnetic field; and
    a nest configured to contain the tube at least partially positioned within the fitting; and
    an inward constraining mandrel positioned within said fitting and said tube;
    said field concentrator and nest concentrating the magnetically exerted pressure to a specific location on at least one of said tube and fitting to produce a sufficient amount of magnetic compressive or expansive force to conform and to deform at least one of said tube and fitting to generate a solid state atomic bonded, cold weld in which the wall portions of the fitting and the tube are metallurgically combined to form the fluid circuit joint, and wherein said mandrel limits the inward displacement of said fitting and said tube.

2. A system as in claim 1 wherein said field concentrator imposes said electromagnetic field to compress the fitting on the tube to form the fluid circuit joint.

3. A system as in claim 1 wherein said nest resides at least partially within said field concentrator.

4. A system as in claim 1 further comprising:
    a controller generating a current pulse signal; and
    a current supply circuit generating an energy pulse in response to said current pulse signal; said induction coil generating said electromagnetic field in response to said current pulse.

5. A system as in claim 1 wherein said field concentrator imposes said electromagnetic field to compress said fitting prior to metallurgical welding thereof.

6. A system as in claim 1 further comprising:
    an end-forming device expanding said fitting prior to insertion of said tube into said fitting; and
    said field concentrator imposing said electromagnetic field on said fitting to metallurgically weld said fitting with said tube to form said fluid circuit joint.

7. A system as in claim 1 further comprising an insert electrically coupled to said field concentrator and imposing said electromagnetic field on said fitting to form said fluid circuit joint.

8. A system as in claim 7 wherein said field concentrator is external to said nest and said insert is coupled at least partially within said nest.

9. A magnetic forming system for creating a non-sealant based metallurgically formed fluid circuit joint between a wall of the end portion of a metal tube and wall of the fitting portion of a hollow metal fitting wherein said tubular portion is partially inserted into said fitting portion of said metal fitting whereby the wall portions of the tube and the fitting are combined into a single shared wall element, comprising:
    an end former expanding at least a portion of the tube;
    an induction coil forming an electromagnetic current;
    a field concentrator assembly electrically coupled to said induction coil and forming an electromagnetic field in response to said electromagnetic current, said field concentrator assembly comprising: a concentrator focusing said electromagnetic current to form said electromagnetic field;
    a nest configured to contain the fitting at least partially positioned within said portion; and
    an inward constraining mandrel positioned within said fitting and said tube;
    said field concentrator and nest concentrating the magnetically exerted pressure to a specific location on at least one of said tube and fitting to produce a sufficient amount of magnetic compressive or expansive force to conform and to deform at least one of said tube and fitting to generate a solid state, atomic bonded cold weld in which the wall portions of the fitting and the tube are metallurgically combined to form the fluid circuit joint, and wherein said mandrel limits the inward displacement of said fitting and said tube.

10. A system as in claim 9 wherein said field concentrator imposes said electromagnetic field to compress said portion on the fitting to form the fluid circuit joint.

11. A system as in claim 9 wherein the fitting comprises a tube overlap region having at least one groove.

12. A system as in claim 9 wherein the fitting comprises:
a tube overlap region comprising;
a radius edge associated with an end of the tube;
a plurality of grooves; and
a break edge guiding insertion of the fitting into the tube.

13. A system as in claim 9 further comprising:
a controller generating a current pulse signal; and
a current supply circuit generating a current pulse in response to said current pulse signal;
said induction coil generating said electromagnetic field in response to said current pulse.

14. A system as in claim 9 wherein said field concentrator imposes said electromagnetic field to compress said tube prior to metallurgical welding thereof.

15. A system as in claim 9 further comprising an insert electrically coupled to said field concentrator and imposing said electromagnetic field on said tube to form said fluid circuit joint.

16. A system as in claim 15 wherein said field concentrator is external to said nest and said insert is coupled at least partially within said nest.

* * * * *